United States Patent [19]

Blanding

[11] Patent Number: 5,019,864
[45] Date of Patent: May 28, 1991

[54] ELECTROPHOTOGRAPHIC FILM CORE DEVICE

[75] Inventor: Douglas L. Blanding, Rochester, N.Y.

[73] Assignee: Eastman Kodak Company, Rochester, N.Y.

[21] Appl. No.: 420,000

[22] Filed: Oct. 11, 1989

[51] Int. Cl.[5] .............................. G03G 5/00
[52] U.S. Cl. .................... 355/212; 198/807; 226/15; 226/19; 226/20; 226/45; 242/57.1; 355/203
[58] Field of Search ........... 355/203, 207, 212; 226/15-21, 45; 198/806, 807; 245/57.1

[56] References Cited

U.S. PATENT DOCUMENTS

| 3,373,288 | 3/1968 | Otepka et al. | 226/20 X |
|---|---|---|---|
| 3,435,693 | 4/1969 | Wright | 74/241 |
| 3,583,615 | 6/1971 | Ott, Jr. | 226/20 |
| 3,715,027 | 2/1973 | Fujimoto | 198/806 |
| 3,796,488 | 3/1974 | Tanaka et al. | 355/212 |
| 3,801,092 | 4/1974 | Jordan | 271/197 |
| 3,818,391 | 6/1974 | Jordan et al. | 355/212 |
| 4,027,966 | 6/1977 | Jordan | 355/212 X |
| 4,429,985 | 2/1984 | Yokota | 355/203 X |
| 4,462,676 | 7/1984 | Shimura et al. | 355/203 |
| 4,477,006 | 10/1984 | Sharp | 226/21 X |
| 4,527,686 | 7/1985 | Satoh | 226/21 X |
| 4,547,059 | 10/1985 | Nagayama et al. | 198/806 X |
| 4,551,001 | 11/1985 | Yokota | 355/212 |
| 4,572,417 | 2/1986 | Joseph et al. | 226/45 X |
| 4,693,363 | 9/1987 | Kuehnert | 198/807 |
| 4,856,960 | 8/1989 | Wheeler et al. | 242/57.1 X |
| 4,860,964 | 8/1989 | Ishii et al. | 226/19 X |

FOREIGN PATENT DOCUMENTS 0030360  3/1979  Japan ..................... 226/20

Primary Examiner—A. T. Grimley
Assistant Examiner—Matthew S. Smith
Attorney, Agent, or Firm—Robert L. Randall

[57] ABSTRACT

A film core for an electrophotographic copying or printing machine comprises a core frame member provided at opposite ends with rollers, such frame member being slightly flexible about a steering axis of one of said rollers, to allow pivotal movement of that roller about the steering axis, but being substantially rigid against any other relative pivotal or translational movement between the ends of the core frame by which the rollers are supported.

11 Claims, 3 Drawing Sheets

ELECTROPHOTOGRAPHIC FILM CORE DEVICE

BACKGROUND OF THE INVENTION

1. Cross-reference to a Related Application

Reference is made to commonly assigned copending patent application Ser. No. 420,078, filed simultaneously herewith in the name of Douglass L. Blanding and entitled SUPPORT MEANS FOR ELECTROPHOTOGRAPHIC FILM CORE AND ASSOCIATED ELEMENTS.

2. Field of the Invention

The present invention relates to electrophotographic copying or printing machines and, more particularly, to a film core device for supporting and guiding a photoconductor belt in such a machine.

3. Description Relative to the Prior Art

Many electrophotographic copiers or printers employ an endless photoconductor belt rather than a photoconductor drum and the device that carries the photoconductor belt, including the belt-supporting rollers, is commonly referred to as a film core.

Because the photoconductor belt or film on a film core is exposed to an image at one location and transfers the toned image to a receiver at another location, it is essential that the belt track accurately with very little lateral drifting movement, so that only very small corrections are required to maintain the belt within a predetermined path; particularly if two or more images are to be superimposed, as in the case of color copying. However, controlling the lateral position of the belt by having it simply abut along one edge with a roller flange or other constraining member is not desirable, because of wear to the belt edge and, because, in such a system, the accurate tracking of the belt is dependent on the accuracy of the edge itself, which is difficult to establish and maintain. Accordingly, many film cores include a steering roller that is pivotable about a steering axis intersecting the center of the roller axis and the portion of the belt partially wrapped around the roller. A belt sensor detects the lateral position of the corresponding edge of the belt and actuates a servo system that pivots the steering roller about its steering axis to control the path of the belt, thereby keeping the belt within a predetermined "dead band" range of lateral positions. The sensor and the servo system can be entirely mechanical or can comprise various combinations of mechanical, electrical, optical, hydraulic or other types of sensors and servo devices.

In the prior art, various structures are employed for providing for the steering movement of the steering roller relative to one or more other rollers or other web supporting elements of the film core. For example, as shown in U.S. Pat. No. 3,796,488 or U.S. Pat. No. 3,801,092, the steering roller can be supported in a yoke that is connected to a rigid frame of the film core by a pivotally supported spindle that defines the steering axis. Alternatively, the side members of the frames that support the steering roller can be pivotally mounted, as shown in U.S. Pat. No. 3,435,693. Yet another alternate approach is to support the steering roller to the rigid frame of the film core by means of one or more flexure members that are flexible to allow pivoting movement of the roller about its steering axis, but which prevent other rotational or translational movements of that roller, other than its rotation about its own axis.

All of the foregoing approaches to defining the pivot axis of the steering roller have advantages and disadvantages but, in common to all of them, is the fact that additional components must be attached to the film core frame to provide for the steering movement of the steering roller.

SUMMARY OF THE INVENTION

In accordance with the present invention, a film core for an electrophotographic copying or printing machine comprises a core frame member provided at opposite ends with rollers, such frame member being slightly flexible about a steering axis of one of said rollers to allow pivotal movement of that roller about the steering axis, but substantially rigid against any other relative pivotal or translational movement between the two rollers or the ends of the core frame by which the rollers are supported. A five-sided box structure provides these characteristics but other frame designs can be employed; the critical consideration being that they allow the steering roller to move relative to the other roller only about the steering axis. A sensor device detects the lateral position of the endless photoconductor belt surrounding the rollers and the frame member and causes a servo mechanism to flexuously distort the frame, thereby pivoting the steering roller about its steering axis to control the lateral location of the belt. This construction is not only very cost-effective to manufacture because of its elimination of separate components to define the roller steering axis, but is also superior to many other designs because of its relative stiffness and correspondingly high resonant frequency and because of its elimination of backlash or vibration resulting from additional bearings or the like.

DESCRIPTION OF THE ILLUSTRATIVE PREFERRED EMBODIMENT

Figure 1:
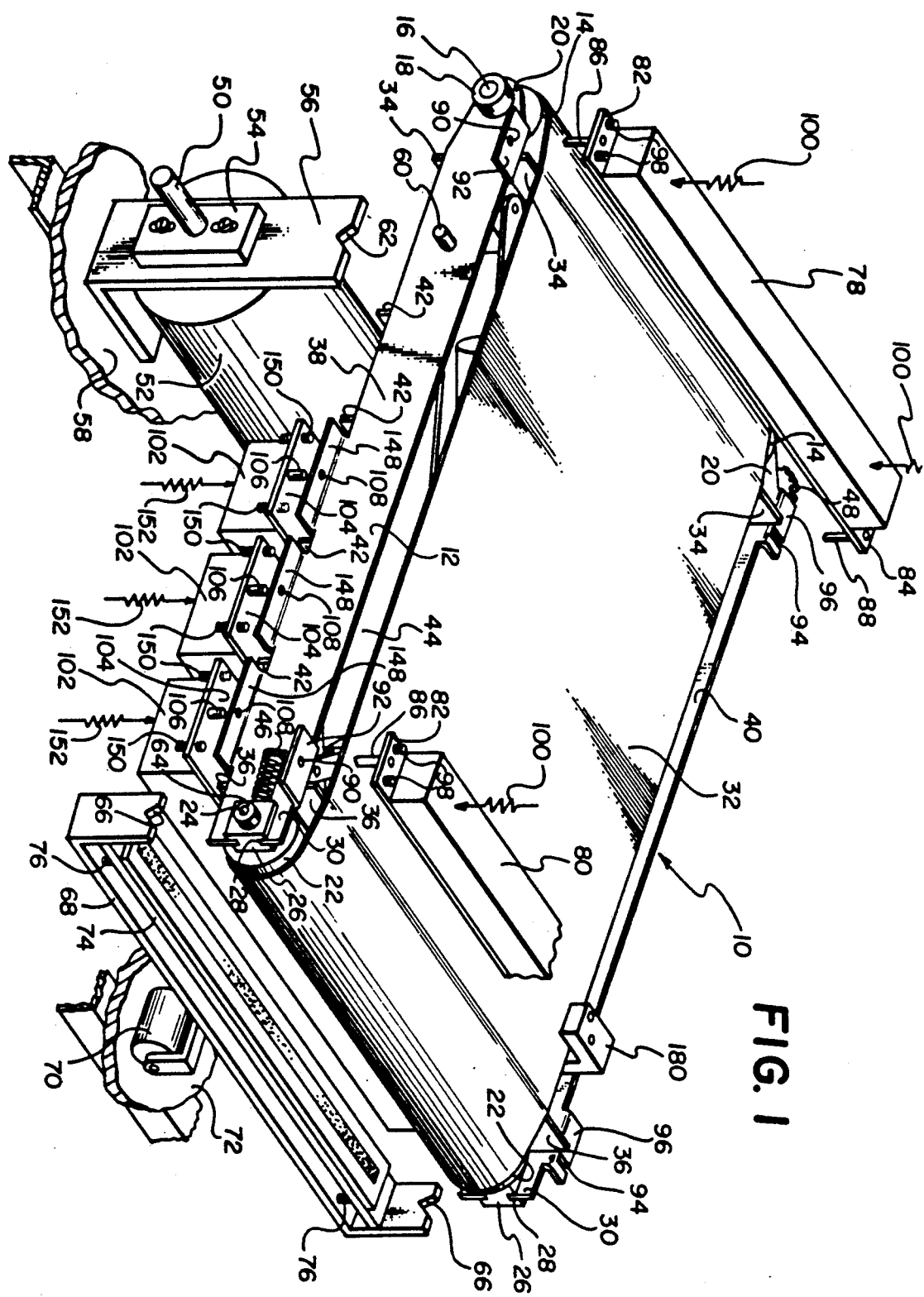
FIG. 1 is a perspective view of a preferred embodiment of the present invention comprising a film core and the means, by which the core cooperates with other elements of an electrophotographic copier machine.

The apparatus shown in FIG. 1, which constitutes the basic elements of an electrophotographic copier, includes a film core 10 comprising a box-like frame 12, a driving roller 14 rotatably supported by shaft 16 between bearings 18 carried by frame ears 20 and a pivotable steering roller 22 rotatably supported by shaft 24 in bearing blocks 26, which are slidably mounted in slots 28 of frame ears 30 at the other end of the frame. An endless photoconductor belt 32 enwraps rollers 14 and 22 and is supported between the rollers by the flat upper and lower edge surfaces of frame end plates 34 and 36, extending between side plates 38 and 40 and along the lower belt run by transverse frame bars 42 below the lower wall member 44 of the film core frame. A spring 46 in each of the bearing support slots 28 engages the corresponding bearing block 26 to resiliently tension belt 32. A gear 48, or other suitable power transmission device, is attached to roller shaft 16 and engages an appropriate drive mechanism, not shown, to rotate driving roller 14 in a clockwise direction, as viewed in the drawings, thereby causing the belt to likewise travel in a clockwise direction so that it moves across the top of the core frame from roller 14 to roller 22.

Below the end of the film core adjacent driving roller 14, the center shaft 50 of a transfer drum 52 is rotatably supported at both ends by adjustable bearing blocks 54 carried by support brackets 56 attached to plate 58 of the machine frame. The corresponding end of the film core is supported above drum 52 by cylindrical studs 60 on side plates 38 and 40, which are received in corresponding V-notches 62 in brackets 56. Only one of the support brackets 56 is shown in FIG. 1, the other being substantially identical at the opposite end of drum 52, as shown schematically in FIG. 3. Drum 52 is driven in a counterclockwise direction by appropriate drive means, not shown, to correlate the peripheral speed of the drum with that of belt 32 so that a sheet or web of paper carried by the transfer drum contacts belt 32 between end plate 34 and the adjacent bar 42 and moves in synchronism with the belt to transfer an image from the belt to the paper. Alternatively, the image may be transferred to the transfer drum itself and then subsequently transferred to the paper or to some other receiver material.

At opposite ends of steering roller 22, bosses 64 of bearing blocks 26, concentric with roller shaft 24, are received in corresponding V-notches 66 of yoke member 68, which is provided with a central support roller 70 that rests on plate 72 of the machine frame. A light-emitting-diode write-head unit 74 is adjustably supported to yoke member 68 by adjusting screws, two of which are shown at numeral 76, to selectively illuminate the portion of the photoconductor belt supported by steering roller 22. Although the write head unit 74 is shown below roller 22 for purposes of clarity, the write head unit can be adjustably supported by yoke member 68 in a vertical position to project an image on the transverse exposure region of the belt centrally located with respect to the portion of the belt encircling roller 22.

As will be described later, the film core is resiliently biased downwardly into its supported engagement with brackets 56 and yoke member 68. Accordingly, the film core is supported to the machine frame by a three-point suspension comprising studs 60 and yoke roller 70, which cannot transmit distortive forces from the machine frame to the film core or vice versa. Also, because drum 52 is adjustable relative to brackets 56 and the write-head unit 74 is adjustable relative to yoke member 68, the critical positioning of the transfer drum and the write-head unit with respect to the adjacent portions of belt 32 is not in any way dependent on the accuracy or dimensional stability of the machine frame or the film core structure.

Above the photoconductor belt, a cleaning station unit 78 is positioned in alignment with end plate 34 and a charging station unit 80 is positioned in alignment with end plate 36. Each of these units is provided with support tongues 82 and 84, which, respectively, support guide pins 86 and 88. Guide pins 86 are received in holes 90 in the corresponding support ears 92 of frame side plate 38 and pins 88 are similarly received in slots 94 in the corresponding support ears 96 of frame side plate 40. Two adjusting screws 98 are provided at opposite sides of each of the pins 86 and a single adjusting screw, not shown, is provided near the center of each support tongue 84. Accordingly, these units are likewise supported to the film core at three points to isolate distortive influences of the units on the core or vice versa and to insure accurate spacing of those units relative to the belt. The cleaning and charging station units are biased downwardly by springs 100 to maintain those units in their adjustable relation to the photoconductor belt and to seat the film core in supported engagement with the V-notches of brackets 56 and yoke member 68. Preferably, the springs 100 movably attach the cleaning station and the charging station units to a movable top cover of the machine, not shown, so that opening the cover automatically raises those units out of engagement with the film core.

Below the film core, three toner applicator units 102 are each similarly provided at each end with end support tongues as shown at numeral 104, each of which is provided with a guide pin 106 receivable in a corresponding hole or slot 108 in lower support ears 148 on the film core frame and with adjusting screws 150 similar to those described above in connection with the cleaning and charging stations to achieve the same type of distortion isolation and spacing accuracy. Each toner station is located below a span of the belt defined by two adjacent bars 42 or the endmost bars and end plates 34 or 36. Springs 152 movably support the toner station unit to the machine frame, thus biasing those units into engagement with the film core while allowing the latter to be conveniently raised out of engagement with the toner units. The strength of springs 100 and 152 are selected such that, in cooperation with the relative weights of the various components, they provide a net downward force on the film core to seat it positively in supported engagement with brackets 56 and yoke member 68.

Figure 2:
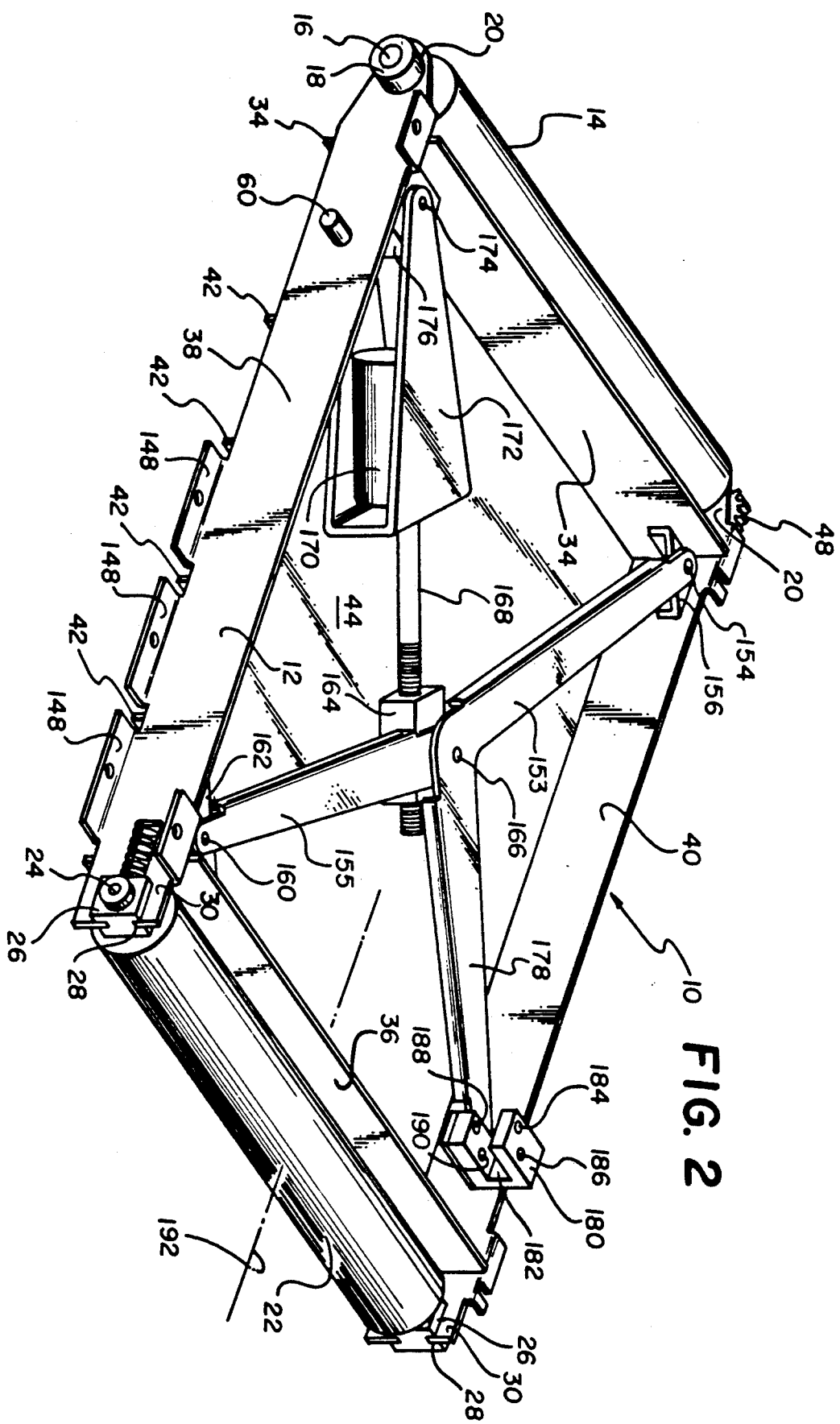
FIG. 2 is a perspective view of the film core alone with the photoconductor belt removed to illustrate internal components.

FIG. 2 illustrates the film core 10 with the photoconductor belt removed to depict the internal film core components, and shows the five-sided box-like configuration of the film core frame defined by side plates 38 and 40, end plates 34 and 36 and bottom wall plate 44.

A toggle lever 153 is pivotally attached by pin 154 to bracket 156 at one corner of the box-like frame adjacent drive roller 14 and near the open face of the frame and another toggle lever 155 is similarly pivotally attached by pin 160 to a corresponding bracket 162 at the corner of the film core frame diagonally opposite bracket 156. At the center of the film core frame, the two toggle levers are pivotally connected to each other and to a nut block 164 by a pin 166. A rod 168, provided with right-hand threads, extends through nut block 164 and is driven by a reversible gear reduction motor 170, carried in a support yoke 172 pivotally mounted by pin 174 to bracket 176 at the end of end plate 34 opposite pivot pin 154 and adjacent the drive roller 14. An arm 178 of toggle lever 153 supports an edge sensor unit 180, including a notch 182 between light-emitting diodes 184 and 186 and corresponding photoreceptors 188 and 190, which provide two edge detectors. The edge of the photoconductor belt 32 is received in notch 182, as shown in FIG. 1. Photoreceptor 188 senses the edge of the belt when its lateral or cross-track movement away from the sensor unit brings the edge partially out of obscuring alignment with that photoreceptor and photoreceptor 190 likewise senses the edge of the belt when its lateral or cross-track movement toward the sensor unit brings the edge partially into obscuring alignment with that photoreceptor; whereby the edge sensor unit defines a so-called "dead band" region or path, within which the belt edge obscures photoreceptor 188 but does not obscure photoreceptor 190.

Figure 3:
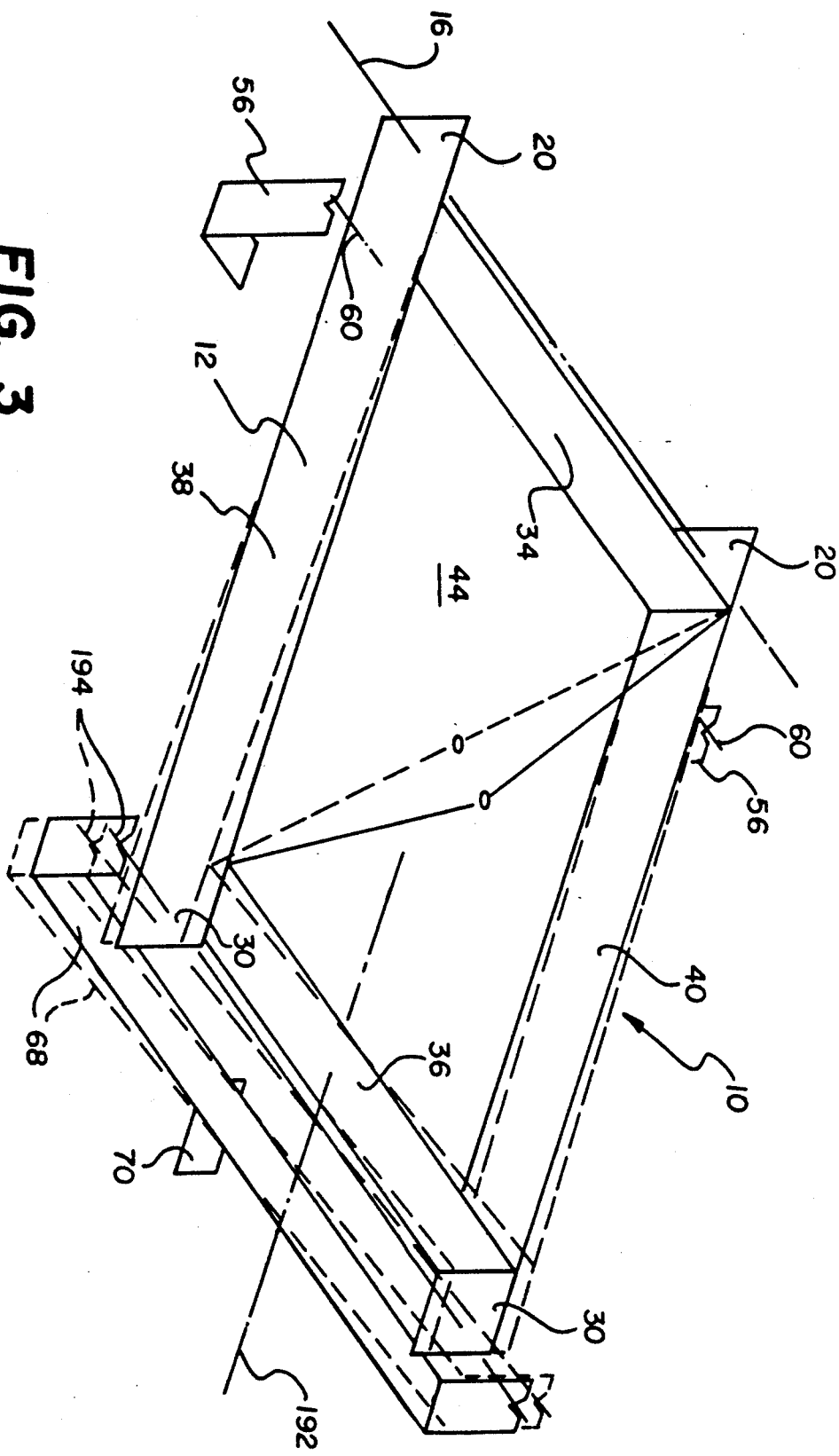
FIG. 3 is a schematic perspective view of the film core showing, greatly exaggerated, the manner in which the film core is distorted to effect belt steering pivotal movement of the steering roller.

As shown in FIGS. 2 and 3, the center toggle arm pivot pin 166 is offset from the center line of the outer end toggle arm pivot pins 154 and 160, so that movement of the center pivot toward motor 170 increases the distance between the end pivot pins 154 and 160 and thereby the distance between the corresponding corners of the box-like frame structure. As shown in broken lines in FIG. 3, this increased dimension and the resulting distortion of the frame 12 causes it to twist and thereby pivot steering roller 22 in a counterclockwise direction about steering axis 192, which extends lengthwise of the film core frame and passes perpendicularly through the center axis 194 of the steering roller in generally parallel relation to the flat portions of photoconductor belt 32. As mentioned previously, the illustrated distortion of the film core in FIG. 3 is very greatly exaggerated for purposes of clarity, the actual movement of the roller required to maintain the belt within its "dead band" range of positions being very slight.

Assuming that the belt is moving in a clockwise direction within its "dead band" and with a small cross-track velocity component away from the edge sensor unit 180, the edge of the belt received in sensor notch 182 will eventually be detected by photoreceptor 188 which will energize the motor to rotate clockwise, as viewed from the motor toward nut block 164, thereby causing the threaded rod 188 to pull nut block 164 toward the motor to impart counterclockwise rotation to the roller 22 about its steering axis; thus reducing the lateral or cross-track velocity of the belt. At the same time, the rotation of toggle lever arm 178 in a clockwise direction about pivot pin 154, causes the sensor unit 180 to move toward the belt. Consequently, the edge of the belt is again within the dead band region between the two photoreceptors 188 and 190, which causes the motor to stop. If this adjustment is not sufficient to eliminate the cross-track movement of the photoconductor belt in that direction, the edge of the belt eventually will again be detected by photoreceptor 188 and the same adjustment will again be repeated. Ultimately, such adjustment will eliminate and reverse the direction of cross-track movement of the photoconductor belt, whereupon photoreceptor 190 will eventually be energized; causing motor 170 to rotate counterclockwise and thereby reversing the adjustment of the steering roller so that the belt is now tending to move toward the sensor unit 180, which, at the same time, is moved slightly away from the belt to again establish the "dead band" condition. Accordingly, the belt is caused to continuously run within its predetermined "dead band" range of cross-track positions with very low cross-track velocity.

Although the adjusting means employed in the illustrative embodiment of the invention is carried by the film core and imparts a twisting distortion to the core by increasing a diagonal dimension, it should be understood that other types of adjusting means could be employed. If such an adjusting device is connected between the core and the machine frame, distortion of the machine frame may be capable of imparting a distortive force to the core through the adjusting device, but this does not violate the distortion isolation concepts of the invention because the belt position sensor automatically compensates for such distortion in the same manner as if it were produced by an adjusting device carried by the core frame.

The invention has been described in detail with particular reference to a presently preferred embodiment, but it will be understood that variations and modifications can be effected within the spirit and scope of the invention.

What is claimed is:

1. A belt supporting and tracking device for movably supporting an endless image receiving belt in an electrophotographic machine, said device comprising:
   (a) a frame structure having spaced first and second ends, which are relatively rigid with respect to each other except in a mode in which said frame structure is distortable in twisting fashion about a steering axis extending lengthwise thereof through said second end thereof;
   (b) first roller support means at said one end of said frame structure for rotatably supporting a first elongate roller;
   (c) second roller support means at said second end of said frame structure for rotatably supporting a second elongate roller generally parallel to said first roller with said steering axis intersecting the center region of said second roller in generally perpendicular relation thereto;
   (d) drive means for imparting longitudinal movement to said belt enwrapping said rollers and said frame structure;
   (e) sensing means for sensing the lateral location of said belt relative to said sensing means along a direction transverse to the longitudinal movement direction of said belt; and
   (f) adjusting means responsive to said sensing means for imparting twisting distortion to said frame structure for pivoting said second roller about said steering axis relative to said first roller to thereby control the lateral position of said belt.

2. The invention defined by claim 1 in which said sensing means is located adjacent one edge of said belt for sensing a lateral shifting tendency of said belt in either direction from a path defined by said sensing means relative to said frame structure, said adjusting means being responsive to said sensing means for distorting said frame structure to alter the lateral shifting tendency of said belt, said sensing means being movable by said adjusting means in coordination with the pivotal movement of said second roller about said steering axis to re-establish the location of said path defined by said sensing means relative to said frame structure.

3. The invention defined in claim 1 in which said adjusting means is supported by said frame structure.

4. The invention defined by claim 3 in which said adjusting means changes a diagonal dimension of said frame structure to cause twisting distortion of said frame structure about said steering axis.

5. The invention defined by claim 1 in which said sensing means is carried by an element of said adjusting means that is movable to impart twisting distortion on said frame structure.

6. The invention defined by claim 1 in which said frame structure is in the form of a five-sided open-faced box defined by first and second parallel spaced side wall members, two parallel spaced end wall members perpendicular to and joining said side wall members toward opposite ends thereof and a closure wall member joined to corresponding edge regions of all four of said end and side wall members, said first roller being supported outwardly adjacent and parallel to said first side wall member and said second roller being supported outwardly adjacent and parallel to said second side wall member.

7. The invention defined by claim 6 in which said adjusting means comprises a toggle linkage located diagonally within said box, said linkage comprising two toggle bars pivotally connected by a central pivot pin and respectively pivotally connected between opposite corners of said box near the open face thereof, and transducer means responsive to said sensing means for moving said pivot pin to change the length of said linkage to thereby impart said twisting distortion to said frame structure.

8. The invention defined by claim 7 in which said transducer means comprises an electric motor responsive to said sensing means.

9. The invention defined by claim 7 in which said sensing means is located adjacent one edge of said belt for sensing the lateral position of said belt, said sensing means being movably carried by an element of one of said two toggle bars.

10. A belt supporting and tracking device for movably supporting an endless image receiving belt in an electrophotographic machine, said device comprising:
   a frame structure having first and second ends;
   a first roller having a longitudinal axis attached to the first end of the frame structure;
   a second roller having a longitudinal axis attached to the second end of the frame structure, said axes of said first and second rollers being substantially parallel;
   means for sensing movement of said belt in a direction parallel with the roller axes; and
   means for twisting the frame structure in response to the sensing of lateral movement of said belt and causing a relative rotation of the axes of the first and second rollers about a steering axis extending between and perpendicular to said rollers to keep the belt within a predetermined lateral position on at least one of said rollers.

11. The supporting and tracking device of claim 10 wherein the frame twisting means includes means for changing a diagonal dimension extending substantially between the first and second ends of the frame structure.

* * * * *